(12) United States Patent
Prasad

(10) Patent No.: US 9,130,620 B2
(45) Date of Patent: Sep. 8, 2015

(54) COORDINATED MULTI-POINT TRANSMISSION AND RECEPTION SCHEMES FOR CELLULAR DOWNLINK

(71) Applicant: NEC Laboratories America, Inc., Princeton, NJ (US)

(72) Inventor: Narayan Prasad, Wyncote, PA (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 14/083,537

(22) Filed: Nov. 19, 2013

(65) Prior Publication Data

US 2014/0140429 A1    May 22, 2014

Related U.S. Application Data

(60) Provisional application No. 61/728,863, filed on Nov. 21, 2012.

(51) Int. Cl.
*H04B 7/04* (2006.01)
*H04B 7/02* (2006.01)

(52) U.S. Cl.
CPC ............ *H04B 7/0456* (2013.01); *H04B 7/0465* (2013.01); *H04B 7/024* (2013.01)

(58) Field of Classification Search
CPC ............... H04L 25/03343; H04L 2025/03426; H04L 2025/03611; H04L 25/0206; H04B 7/0456; H04B 7/0465; H04B 7/0626; H04B 7/04; H04B 7/0619; H04B 7/024
USPC ......... 375/295, 296, 316, 340, 346, 354, 358; 455/39, 68, 69
See application file for complete search history.

(56) References Cited

U.S. PATENT DOCUMENTS

2012/0069928 A1* 3/2012 Jose et al. ............. 375/285
2012/0170676 A1* 7/2012 Tajer et al. ............. 375/267

* cited by examiner

*Primary Examiner* — Vineeta Panwalkar
(74) *Attorney, Agent, or Firm* — Joseph Kolodka

(57) ABSTRACT

There is provided a method for generating transmit precoders for a communication system having a plurality of transmitters and a plurality of receivers forming a plurality of transmitter-receiver pairs. Each of the transmitters and receivers has a respective plurality of antennas. The method includes initializing the transmit precoders. The method further includes updating a plurality of receiver filters and a plurality of slack variables using closed form expressions. The method also includes updating the transmit precoders responsive to an output of said prior updating step. The method additionally includes iteratively repeating the updating steps until convergence is reached to obtain a final set of transmit precoders. The transmit precoders are updated to perform precoding for multiple stream data transmission for each of the plurality of transmitter-receiver pairs on each of a plurality of slots under a per-antenna power constraint imposed on each of the plurality of antennas.

16 Claims, 9 Drawing Sheets

COORDINATED MULTI-POINT TRANSMISSION AND RECEPTION SCHEMES FOR CELLULAR DOWNLINK

RELATED APPLICATION INFORMATION

This application claims priority to provisional application Ser. No. 61/728,863 filed on Nov. 21, 2012, incorporated herein by reference.

BACKGROUND

1. Technical Field

The present invention relates to signal processing, and more particularly to coordinated multi-point transmission and reception schemes for cellular downlink.

2. Description of the Related Art

The design of linear precoding schemes has been considered in the context of Multiple Input Multiple Output (MIMO) broadcast channels and MIMO interference channels mostly under a sum power constraint on each transmitter. The design of precoding schemes under practically more relevant per-antenna power constraint has received much less attention.

SUMMARY

These and other drawbacks and disadvantages of the prior art are addressed by the present principles, which are directed to coordinated multi-point transmission and reception schemes for cellular downlink.

According to an aspect of the present principles, there is provided a method for generating transmit precoders for a communication system having a plurality of transmitters and a plurality of receivers forming a plurality of transmitter-receiver pairs. Each of the plurality of transmitters and the plurality of receivers has a respective plurality of antennas. The method includes initializing the transmit precoders. The method further includes updating a plurality of receiver filters and a plurality of slack variables using closed form expressions. The method also includes updating the transmit precoders responsive to an output of said prior updating step. The method additionally includes iteratively repeating the updating steps until convergence is reached to obtain a final set of transmit precoders. The transmit precoders are updated to perform precoding for multiple stream data transmission for each of the plurality of transmitter-receiver pairs on each of a plurality of slots under a per-antenna power constraint imposed on each of the plurality of antennas.

According to another aspect of the present principles, there is provided an apparatus for generating transmit precoders for a communication system having a plurality of transmitters and a plurality of receivers forming a plurality of transistor-receiver pairs. Each of the plurality of transmitters and the plurality of receivers has a respective plurality of antennas. The apparatus includes a transmit precoder initializer for initializing the transmit precoders. The apparatus further includes an updater for updating a plurality of receiver filters and a plurality of slack variables, as a first part of an iteration. The apparatus also includes a transmit precoder updater for updating the transmit precoders responsive to an output of the first part of the iteration, as a second part of the iteration. The apparatus additionally includes an iteration controller for iteratively repeating the first part of the iteration that updates of the receiver filters and the slack variables and the second part of the iteration that updates the transmit precoders until convergence is reached to obtain a final set of transmit precoders. The transmit precoders are updated to perform precoding for multiple stream data transmission for each of a plurality of transmitter-receiver pairs on each of a plurality of slots under a per-antenna power constraint imposed on each of the plurality of transmitters. The receiver filters and the slack variables are updated using closed form expressions.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
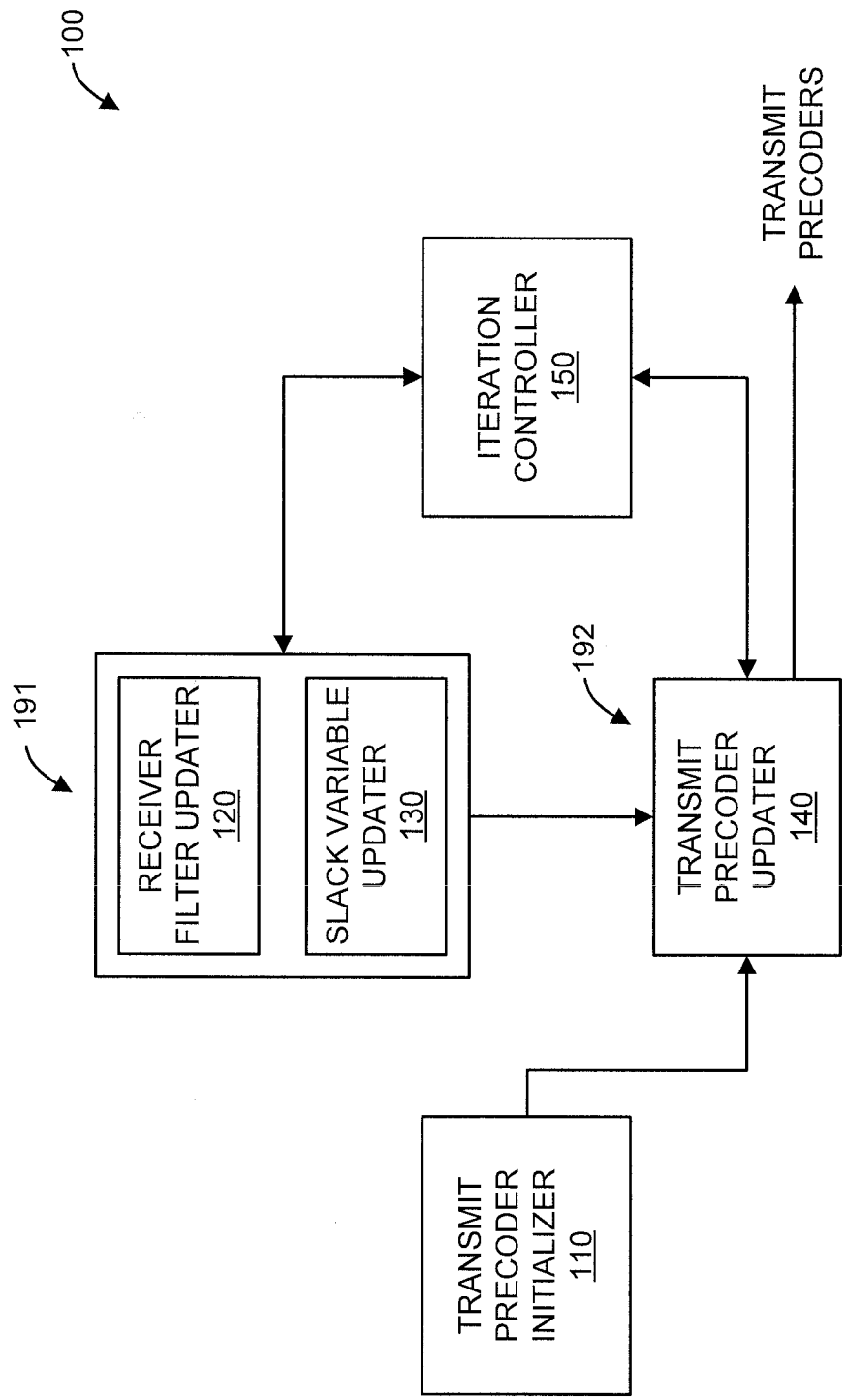
FIG. 1 shows an apparatus 100 for generating transmit precoders for a communication system having a plurality of transmitters and a plurality of receivers.

The present principles are directed to coordinated multi-point transmission and reception schemes for cellular downlink.

In an embodiment, the present principles can be applied to a downlink with multiple users (receivers) and multiple transmitters, where multiple antennas are present at all transmitters and receivers. Over such a downlink, linear transmit precoding and decoding schemes using linear receivers can be used.

In practice, the problem of maximizing the "weighted-sum rate" in such a downlink is particularly important since it encompasses several utility maximization problems. The present principles propose specific designs of linear transmit precoders under linear receivers and per-antenna power constraints. The resulting precoder design problems are captured through optimization frameworks.

In an embodiment, the present principles are envisioned for use for the fourth generation cellular downlink. However, it is to be appreciated that the present principles are not limited to the precoding downlink, and may be applied to other downlinks as well as other communications application given the teachings of the present principles provided herein, while maintaining the spirit of the present principles.

In an embodiment, we consider the design of coordinated multi-point transmission and reception schemes for the fourth generation cellular downlink, wherein a set of disparate transmission points serve multiple users on an available spectrum. For efficient resource allocation, the set of transmission points is partitioned into several clusters and each cluster is pre-assigned a separate set of users that it should serve. In an embodiment, we focus on joint resource allocation (joint scheduling) using all the transmission points in a cluster. We adopt a two-step approach for this joint resource allocation problem. The first step determines a feasible user selection using a suitable approximation algorithm after making certain simplifying assumptions on the transmit precoders that can be employed. In the second step, the transmit precoders are fine-tuned for a given user selection and per-antenna transmit power constraints are enforced. Six novel approaches to solve the latter precoder optimization under per-antenna transmit power constraints are presented and their respective optimal properties are established.

In order to accommodate the explosive growth in data traffic, network operators are increasingly relying on cell splitting, wherein multiple transmission points (transmitters) are placed in a cell traditionally covered by a single macro base station. Such transmission points can be sophisticated high power nodes but are more likely to be low-power remote radio heads of modest capabilities. The networks formed by such disparate transmission points are referred to as heterogeneous networks (a.k.a., HetNets) and are rightly regarded as the future of all next generation wireless networks. In the HetNet architecture, the basic coordination unit is referred to as a cluster which includes multiple transmitters. Coordinated resource allocation within a cluster must be accomplished at a very fine time scale, typically once every millisecond. This, in turn, implies that all transmitters within each cluster must have fiber connectivity and hence the formation of clusters (a.k.a., clustering) is dictated by the available fiber connectivity among transmitters. On the other hand, coordination among different clusters is expected to be done on a much slower time-scale. Consequently, each user can be associated with only one cluster and the association of users to clusters needs to be done only once every few seconds.

In one or more embodiments described herein, our interest is on the dynamic coordination within each cluster. Since user association and clustering happen on time scales which are several orders of magnitude coarser, we assume them to be given and fixed. Substantial performance gains are possible if interference is managed via coordinated resource allocation. We rely on the emulation of such HetNets as specified by the Third Generation Partnership Project (3GPP) Long Term Evolution (LTE) standards body which has considered HetNet deployments in a very comprehensive manner. Towards realizing efficient intra-cluster dynamic coordination, we adopt a two-step approach. In the first step, certain restrictions are imposed on the transmit precoders that can be employed at each transmitter and several approximation algorithms are designed to obtain feasible user selection. In the second step, the transmit precoders are optimized for the given user selection and per-antenna transmit power constraints are enforced. In an embodiment, our results apply to the MIMO interference channel.

FIG. 1 shows an apparatus 100 for generating transmit precoders for a communication system having a plurality of transmitters and a plurality of receivers. Each of the plurality of transmitters and the plurality of receivers respectively has a plurality of antennas. The apparatus 100 includes a transmit precoder initializer 110, a receiver filter updater 120, a slack variable updater 130, a transmit precoder updater 140, and an iteration controller 150. The transmit precoder initializer 110 initializes the transmit precoders $V_j[n]$ for transmitters $1 \leq j \leq K$ to a set of non-zero values satisfying the power constraints in Equation (2). The receiver filter updater 120 updates receiver filters $G_i[n]$ for receivers $1 \leq i \leq K$ using Equation (12). The slack variable updater 130 updates slack variables s using Equation (13). The transmit precoder updater 140 updates transmit precoders $V_j[n]$ for transmitters $1 \leq j \leq K$. The iteration controller 150 controls the number of iterations between updating the receiver filters and the slack variables as one step/unit 191 and the updating the transmit precoders as another step/unit 192. The iterations are controlled such that they terminate when, for example, convergence or a maximum predetermined number of iterations is reached. In an embodiment, each of the elements includes a processor. However, in other embodiments, one or more of the elements can include a processor, with remaining ones of the elements having access to the processor or results provided by the processor. These and other variations of the elements of apparatus 100 are readily contemplated by one of ordinary skill in the art given the teachings of the present principles provided herein, while maintaining the spirit of the present principles.

Figure 2:
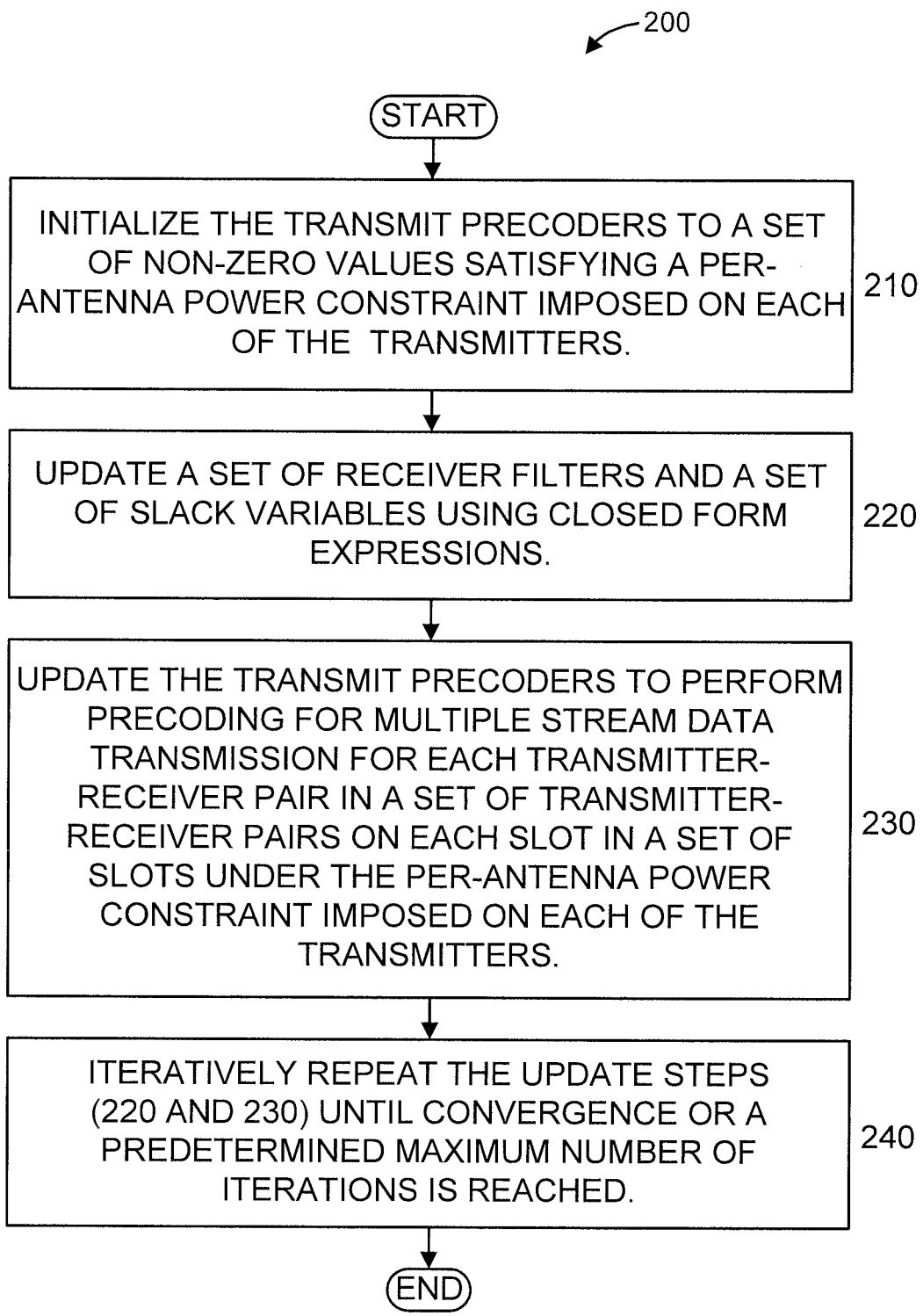
FIG. 2 shows a method 200 for generating transmit precoders for a communication system having a plurality of transmitters and a plurality of receivers.

FIG. 2 shows a method 200 for generating transmit precoders for a communication system having a set of transmitters and a set of receivers. Each of the transmitters and receivers respectively has a set of antennas. At step 210, initialize the transmit precoders to a set of non-zero values satisfying a per-antenna power constraint imposed on each of the transmitters. At step 220, update a set of receiver filters and a set of slack variables using closed form expressions. At step 230, update the transmit precoders. In step 230, the transmit precoders are updated to perform precoding for multiple stream data transmission for each transmitter-receiver pair in a set of transmitter-receiver pairs (formed from the set of transmitters and the set of receivers) on each of a plurality of slots under a per-antenna power constraint imposed on each of the transmitters.

At step 240, iteratively repeat the updating steps (220 and 230) until convergence or a predetermined maximum number of iterations is reached.

It is to be appreciated that the present principles provide six exemplary ways in which to update the transmit precoders in step 230, also interchangeably referred to as transmit precoder update methods 1 through 6, and shown with respect to methods 300, 400, 500, 600, 700, and 800.

Figure 3:
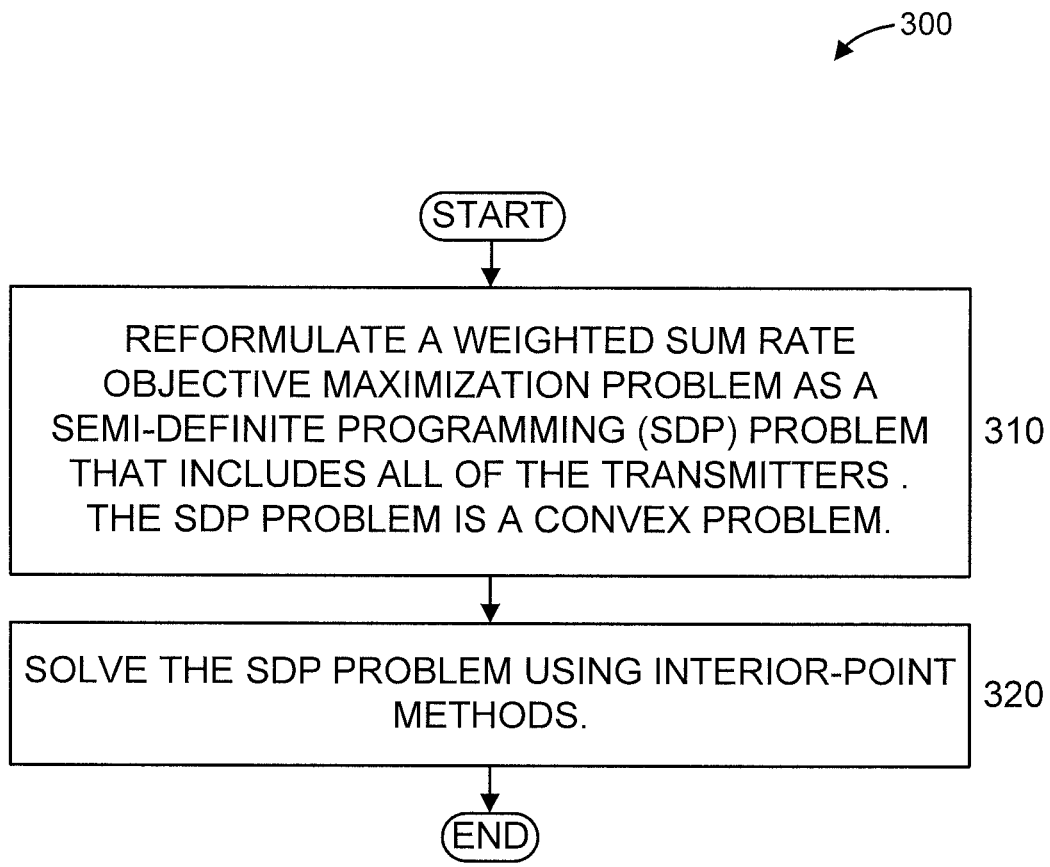
FIG. 3 shows transmit precoder update method 1, in accordance with an embodiment of the present principles.

FIG. 3 shows transmit precoder update method 1 (also interchangeably designated by the reference numeral 300), in accordance with an embodiment of the present principles. At step 310, reformulate a weighted sum rate objective maximization problem as a Semi-Definite Programming (SDP) problem that includes all of the transmitters. The SDP problem is a convex problem. At step 320, solve the SDP problem using interior-point methods (e.g., arguments leading to Proposition 5).

Figure 4:
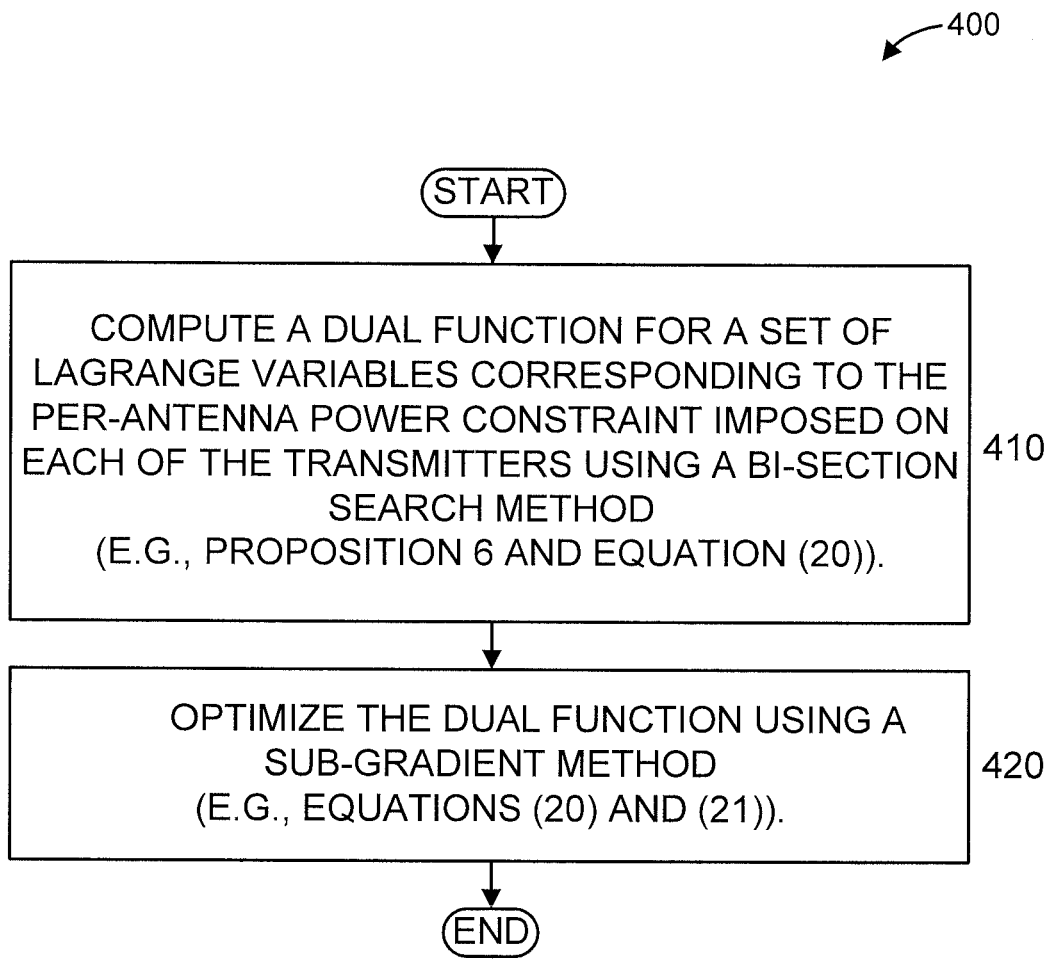
FIG. 4 shows transmit precoder update method 2, in accordance with an embodiment of the present principles.

FIG. 4 shows transmit precoder update method 2 (also interchangeably designated by the reference numeral 400), in accordance with an embodiment of the present principles. At step 410, compute a dual function for a set of Lagrange variables corresponding to the per-antenna power constraint imposed on each of the transmitters using a bi-section search method (e.g., Proposition 6 and Equation (20)). At step 420, optimize the dual function using a sub-gradient method (e.g., Equations (20) and (21)).

Figure 5:
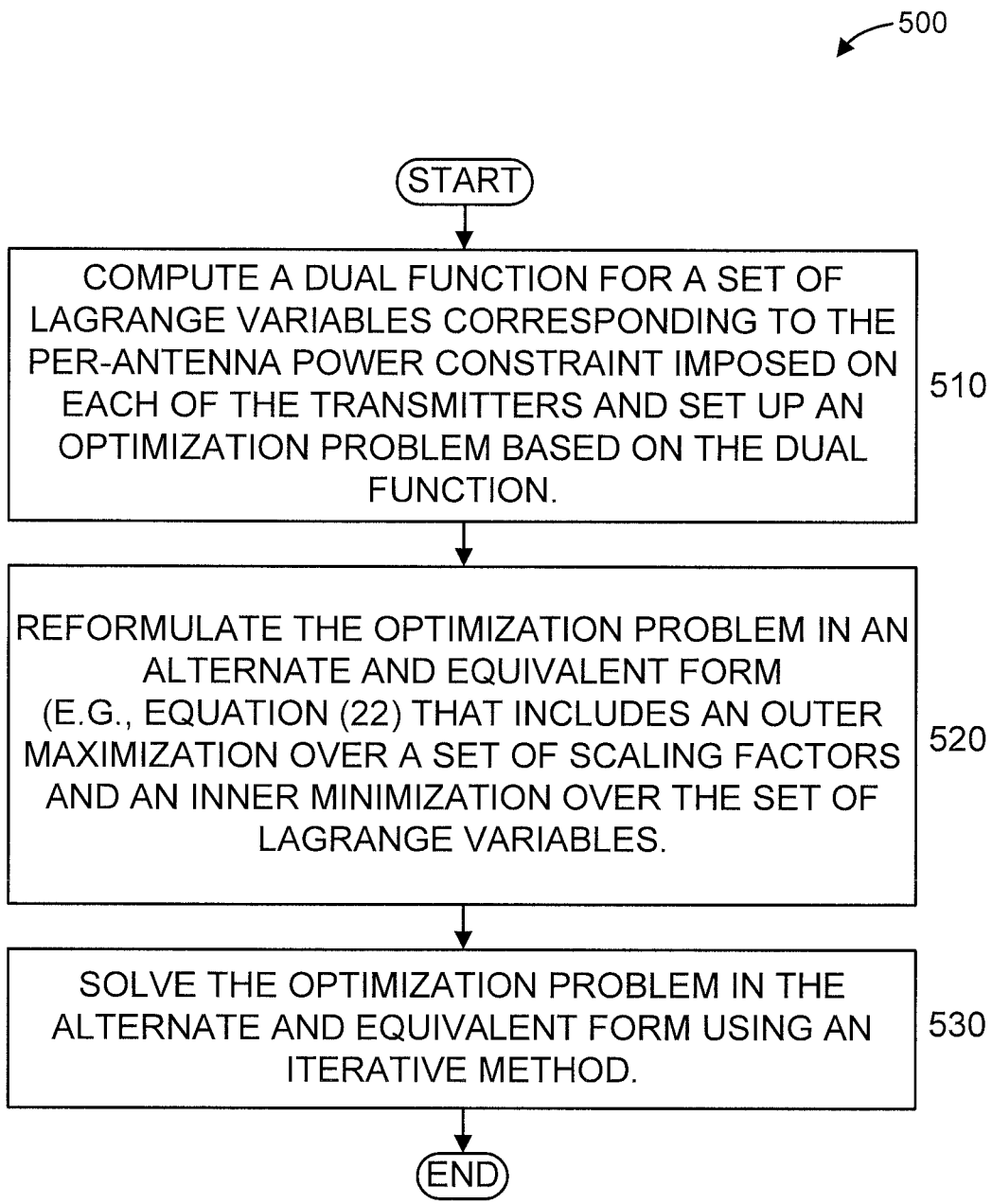
FIG. 5 shows transmit precoder update method 3, in accordance with an embodiment of the present principles.

FIG. 5 shows transmit precoder update method 3 (also interchangeably designated by the reference numeral 500), in accordance with an embodiment of the present principles. At step 510, compute a dual function for a set of Lagrange variables corresponding to the per-antenna power constraint imposed on each of the transmitters and set up an optimization problem based on the dual function. At step 520, reformulate the optimization problem in an alternate and equivalent form (e.g., Equation (22)) that includes an outer maximization over a set of scaling factors and an inner minimization over the set of Lagrange variables. At step 530, solve the optimization problem in the alternate and equivalent form using an iterative method.

Figure 6:
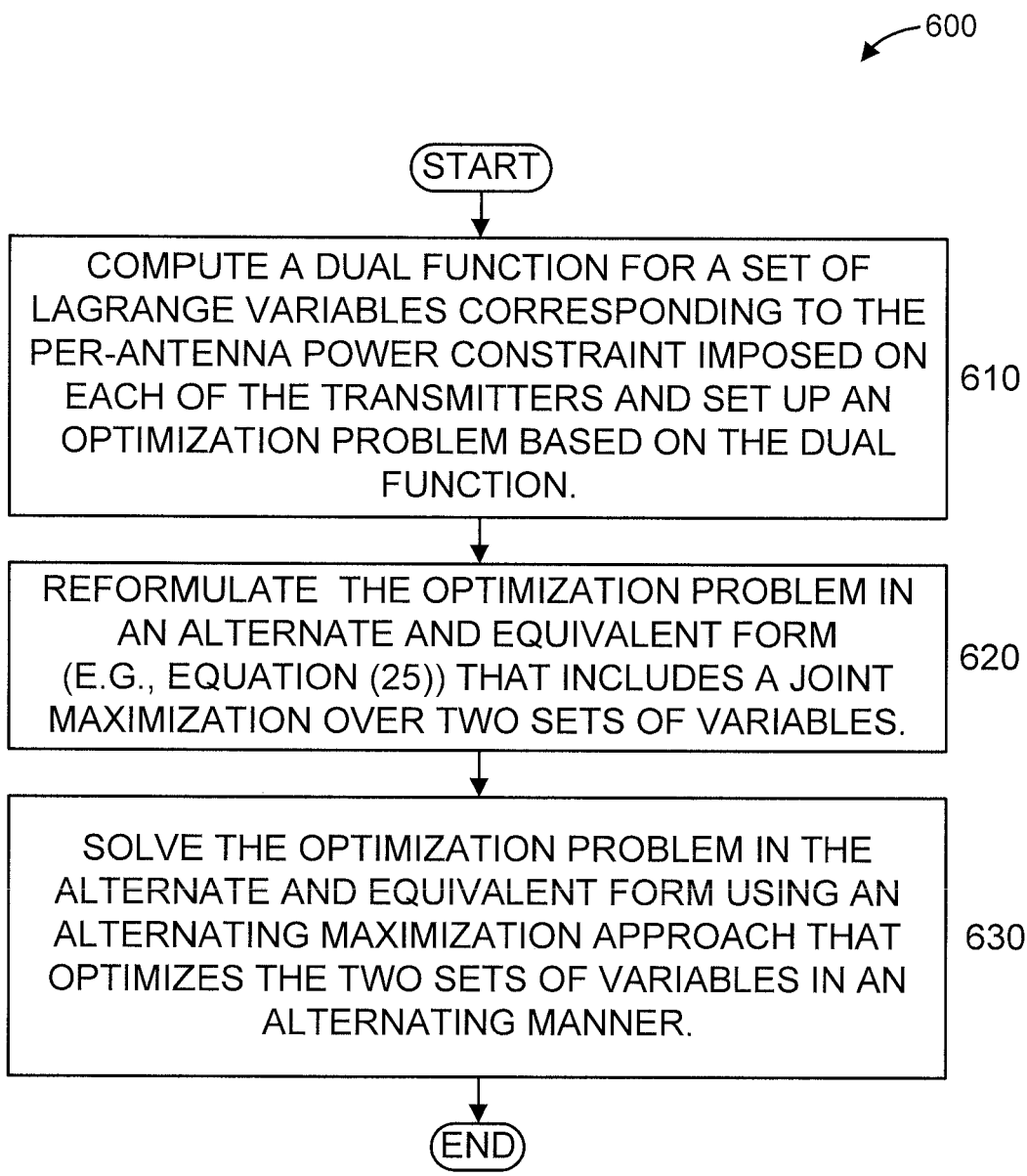
FIG. 6 shows transmit precoder update method 4, in accordance with an embodiment of the present principles.

FIG. 6 shows transmit precoder update method 4 (also interchangeably designated by the reference numeral 600), in accordance with an embodiment of the present principles. At step 610, compute a dual function for a set of Lagrange variables corresponding to the per-antenna power constraint imposed on each of the transmitters and set up an optimization problem based on the dual function. At step 620, reformulate the optimization problem in an alternate and equivalent form (Equation (25)) that includes a joint maximization over two sets of variables. At step 630, solve the optimization problem in the alternate and equivalent form using an alternating maximization approach that optimizes the two sets of variables in an alternating manner. Note that the form in Equation (22) involves maximization over one set of variables but minimization over another set of variables, so it is not conducive to an alternating optimization. In contrast, since Equation (25) involves only maximization over several sets of variables, we can employ an alternating maximization approach to solve (25).

Figure 7:
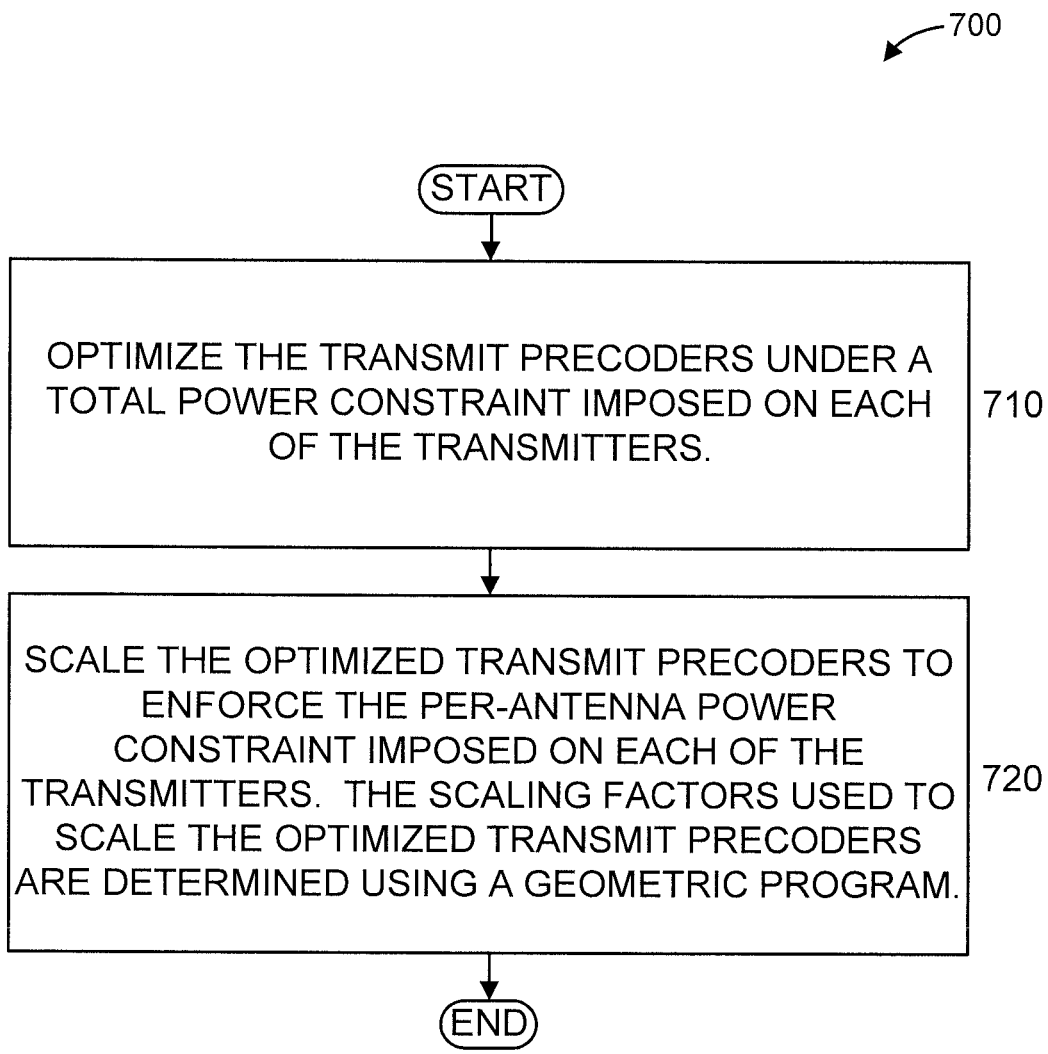
FIG. 7 shows transmit precoder update method 5, in accordance with an embodiment of the present principles.

FIG. 7 shows transmit precoder update method 5 (also interchangeably designated by the reference numeral 700), in accordance with an embodiment of the present principles. At step 710, optimize the transmit precoders under a total power constraint imposed on each of the transmitters. At step 720, scale (e.g., using one scaling factor $\gamma[n]$ per slot n) the optimized transmit precoders to enforce the per-antenna power constraint imposed on each of the transmitters. The scaling factors used to scale the optimized transmit precoders are determined using a geometric program.

Figure 8:
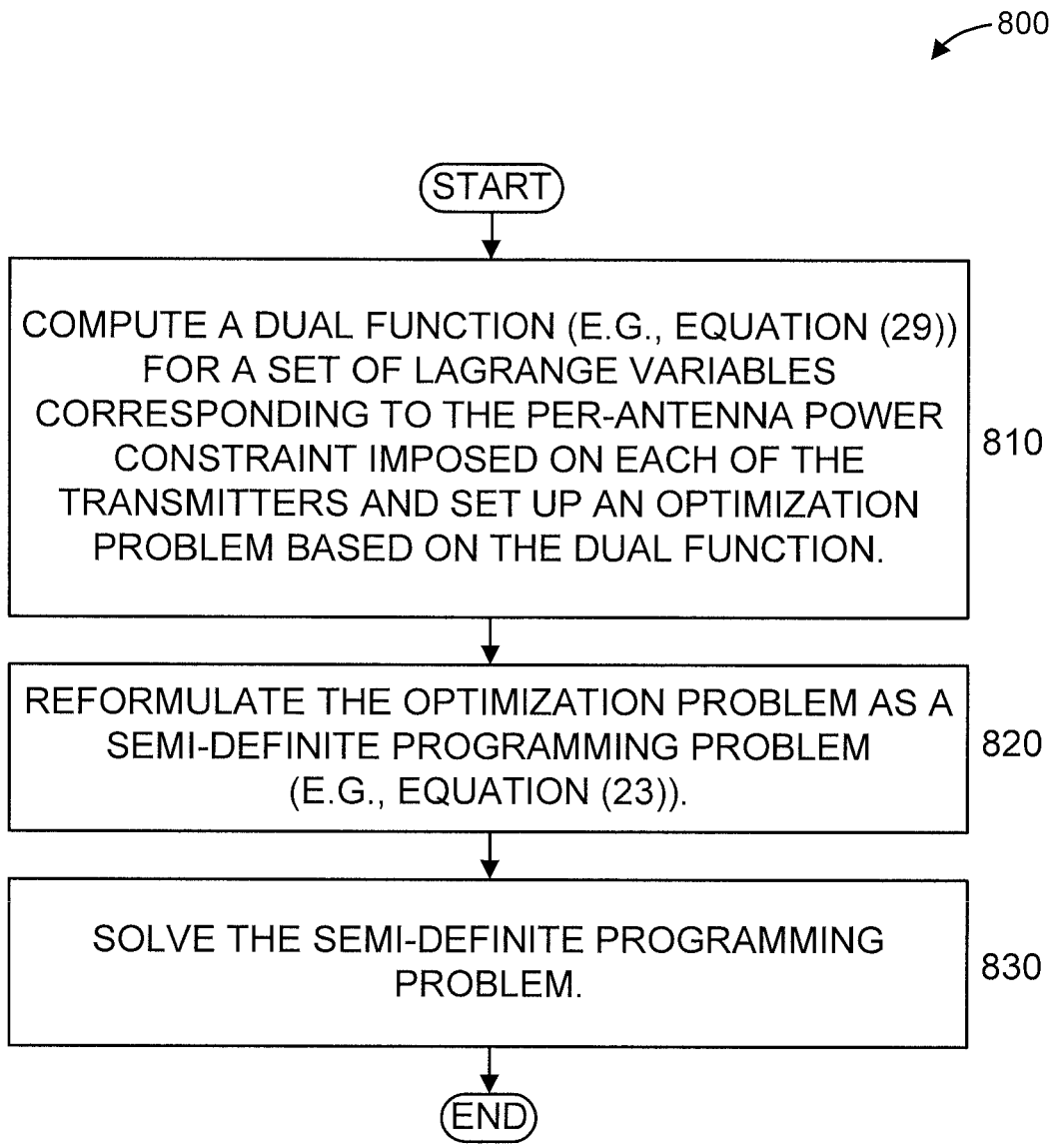
FIG. 8 shows transmit precoder update method 6, in accordance with an embodiment of the present principles.

FIG. 8 shows transmit precoder update method 6 (also interchangeably designated by the reference numeral 800), in accordance with an embodiment of the present principles. At step 810, compute a dual function (e.g., Equation (29)) for a set of Lagrange variables corresponding to the per-antenna power constraint imposed on each of the transmitters and set up an optimization problem based on the dual function. At step 820, reformulate the optimization problem as a semi-definite programming problem (e.g., Equation (23)). At step 830, solve the semi-definite programming problem.

A description will now be given regarding a system model and preliminaries, in accordance with an embodiment of the present principles.

We consider a wideband MIMO Gaussian interference channel including K transmission points, labeled 1, 2, . . . , K. The $j^{th}$ transmission point has $M_j$ antennas and can transmit over N mutually orthogonal slots. On each slot, each transmitter transmits data intended for, at-most, one pre-determined user (equipped with multiple receive antennas) associated with it. The user associated with a transmitter can vary across slots and can be a null user to cover the case where the transmitter should remain silent on one or more slots. We also impose the restriction that on each slot, each scheduled user can receive data from at-most one transmitter. This is due to the fact that reliably receiving data simultaneously from multiple transmitters on a slot requires additional feedback from the users which need not be available. Without loss of generality, we will use the $i^{th}$ receiver on slot n to denote the user associated with transmitter i on slot n for all $i \in \{1, \ldots, K\}$ & $n \in \{1, \ldots, N\}$. Then, the input-out transmitter relations that describe the interference channel are as follows:

$$y_i[n] = \sum_{j=1}^{K} H_{i,j}[n] x_j[n] + z_i[n], \quad (1)$$

where $x_j[n] \in \mathbb{C}^{M_j \times 1}$ is the signal transmitted by the $j^{th}$ transmitter on the $n^{th}$ slot, $H_{i,j}[n]$ is the channel matrix from $j^{th}$ transmitter to $i^{th}$ receiver on slot n, $z_i[n]$ is the additive complex Gaussian $C\mathcal{N}(0, I)$ noise at $i^{th}$ receiver and $y_i[n]$ is the signal received at the $i^{th}$ receiver, on slot n, respectively. A per-antenna power constraint is imposed on each transmitter j as follows:

$$\sum_{n=1}^{N} |x_{j,m}[n]|^2 \le P_{j,m}, \forall m, \quad (2)$$

where we use $x_{j,m}[n]$ to denote the symbol transmitted by the $j^{th}$ transmitter on the $n^{th}$ slot using its $m^{th}$ transmit antenna, so that $x_j[n] = [x_{j,1}[n], \ldots, x_{j,M_j}[n]]^T$. For later use, we let $P_j = [P_{j,1}, \ldots, P_{j,M_j}]^T$. For any vector v, we let diag(v) denote the diagonal matrix whose main diagonal comprises of elements of v. Conversely, for any square matrix V we let diag (V) denote the vector formed by the diagonal elements of V. Furthermore, for any vector v, we let $v \succ 0 (v \succeq 0)$ denote that each element of v is positive (non-negative), whereas for any square matrix V, we let $V \succ 0 (V \succeq 0)$ denote that V is positive definite (positive semi-definite).

Next, we state two results that are used later herein. The following lemma allows us to introduce auxiliary variables to obtain optimally solvable sub-problems.

Lemma 1:

Let d be any positive integer and $E \in \mathbb{C}^{d \times d}$ be any matrix such that $E \succ 0$. Consider the function. Consider the function $f(S) = -\text{Tr}(SE) + \log|S| + d$. Then, the following applies:

$$\max_{S \in \mathbb{C}^{d \times d}, S \succ 0} f(S) = \log|E^{-1}|,$$

with the optimum value $S^{opt} = E^{-1}$.

The following form of a semi-definite program and its dual along with the stated results can be inferred from known results.

Lemma 2:

For any given Hermitian matrices $\{A_i \in \mathbb{C}^{p \times p}\}_{i=0}^{q}$ and any real-valued vector $c \in \mathbb{R}^q$, some $p, q \in \mathbb{Z}_+$, a primal semi definite program is given by the following:

$$\min_{x \in \mathbb{R}^q} c^T x \quad (3)$$

$$\text{s.t. } A_0 + \sum_{i=1}^{q} A_i x_i \succeq 0; x \ge 0$$

and its dual can be written as follows:

$$\max_{Z \in \mathbb{C}^{p \times p}} \text{Tr}(-A_0 Z) \quad (4)$$

$$\text{s.t. } Z \succeq 0; \text{Tr}(A_i Z) \le c_i, \forall 1 \le i \le q.$$

Let $\hat{p}$ and $\hat{d}$ denote the optimal values of Equations (3) and (4), respectively. Then, $\hat{p} \leq \hat{d}$ (a.k.a. weak duality). If the primal problem is strictly feasible, i.e., $\exists x \succ 0 : A_0 + \Sigma_{i=1}^q A_i x_i \succ 0$, or if the dual problem is strictly feasible, i.e. $\exists Z \succ 0 : \text{Tr}(A_i Z) < c_i, \forall i$, then $\hat{p} = \hat{d}$ (a.k.a. strong duality).

We focus on a simple communication system that employs linear transmit precoders and linear receive filters so that the $i^{th}$ transmitter-receiver pair on slot n can transmit and receive $d_i[n]$ streams, where $d_i[n]$ is also pre-determined. On slot n, we denote the encoded symbols at $j^{th}$ transmitter by $u_j[n] \in \mathbb{C}^{d_j[n] \times 1}$, the precoder at $j^{th}$ transmitter by $V_j[n] \in \mathbb{C}^{M_j \times d_j[n]}$, and the filter at $i^{th}$ receiver by $G_i[n]$, respectively. Now, using Equation (1), the output of the $i^{th}$ receiver filter on the $n^{th}$ slot can be expressed as follows:

$$\hat{u}_i[n] = \sum_{j=1}^{K} G_i^\dagger[n] H_{i,j}[n] V_j[n] u_j[n] + G_i^\dagger[n] z_i[n]. \quad (5)$$

From (5), the received signal corresponding to the $l^{th}$ stream on slot n is given by the following:

$$\hat{u}_{i,l}[n] = \sum_{j=1}^{K} \sum_{k=1}^{d_j[n]} g_{i,l}^\dagger[n] H_{i,j}[n] v_{j,k}[n] u_{j,k}[n] + g_{i,l}^\dagger[n] z_i[n]. \quad (6)$$

Then, the achievable rate corresponding to the $i^{th}$ transceiver pair on slot n across all $d_i[n]$ streams is denoted by $R_i[n]$ which is equal to the following:

$$\sum_{l=1}^{d_i[n]} \underbrace{\max_{g_{i,l}[n]} \log\left(1 + \frac{|g_{i,l}^\dagger[n] H_{i,i}[n] v_{i,l}[n]|^2}{\sum_{(j,k) \neq (i,l)} |g_{i,l}^\dagger[n] H_{i,j}[n] v_{j,k}[n]|^2 + \|g_{i,l}[n]\|^2}\right)}_{R_{i,l}[n]} \quad (7)$$

The problem of interest is the precoder design that maximizes the weighted sum-rate subject to per-antenna power constraints, which can be formulated as follows:

$$\max_{\{V_i[n]\}: \sum_{n=1}^{N} \text{diag}(V_i[n] V_i^\dagger[n]) \leq P_i, \forall i} \sum_{i=1}^{K} \sum_{n=1}^{N} w_i[n] R_i[n] \quad (8)$$

where $w_i[n] \in \mathbb{R}_+$ are given weights.

Remark 1:

The motivation behind considering weighted-sum rate is that long-term network utility maximization is often performed by adapting these weights over time (at a larger time-scale). From our perspective here, these weights can be considered as given constants.

$$\max_{\substack{\{V_i[n]\}: \sum_{n=1}^{N} \text{diag}(V_i[n] V_i^\dagger[n]) \leq P_i, \forall i \\ s, \{G_i[n]\}}} \sum_{i=1}^{K} \sum_{n=1}^{N} \sum_{l=1}^{d_i[n]} w_i[n] \quad (11)$$

$$(-e_{i,l}[n] s_{i,l}[n] + \log(s_{i,l}[n]) + 1)$$

A description will now be given regarding transceiver optimization, in accordance with an embodiment of the present principles.

We start with the well-known relation between the achievable rate $R_{i,l}[n]$ and the mean-square-error (MSE) with optimal receive filter. The MSE on slot n for the stream given in Equation (6) is given by the following:

$$e_{i,l}[n] = \quad (9)$$
$$|g_{i,l}^\dagger[n] H_{i,i}[n] v_{i,l}[n] - 1|^2 + \sum_{(j,k) \neq (i,l)} |g_{i,l}^\dagger[n] H_{i,j}[n] v_{j,k}[n]|^2 + \|g_{i,l}[n]\|^2.$$

We denote the corresponding MSE with optimal receive filter by $\hat{e}_{i,l}[n]$. The following lemma states the well-known relation.

Lemma 3:

The achievable rate $R_{i,l}[n]$ in Equation (7) and the MSE in Equation (9) with optimal receive filter, denoted by $\hat{e}_{i,l}[n]$, are related as follows:

$$R_{i,l}[n] = \log\left(\frac{1}{\hat{e}_{i,l}[n]}\right), \forall i, l, n. \quad (10)$$

Next, considering Equation (8) we invoke Lemma 3 and then apply Lemma 1 with slack variables $s = \{s_{i,l}[n]\}$ to reformulate it as in Equation (11). Here $e_{i,l}[n]$ is the mean-square-error given by Equation (9). This formulation includes a weighted MSE minimization sub-problem which is more tractable.

For completeness, we will first show that the sub-problem in the receive filters and slack variables can be solved optimally in closed-form. This lemma is well known and follows directly from standard results on optimal MSE receive filter and Lemma 1.

Lemma 4:

Consider the sub-problem in Equation (11) for any given $\{V_j[n]\}, \forall j, n$. Then, the optimal receive filters, $G_i^{opt}[n] = [g_{i,1}^{opt}[n], \ldots, g_{i,d_i[n]}^{opt}[n]] \forall i, n$, are given by the following:

$$\left(\sum_{j=1}^{K} H_{i,j}[n] V_j[n] V_j^\dagger[n] H_{i,j}^\dagger[n] + I\right)^{-1} H_{i,i}[n] V_i[n]. \quad (12)$$

Furthermore, the optimal s is given by the following:

$$s_{i,l}^{opt}[n] = \frac{1}{e_{i,l}[n]}, \forall i, l, n, \quad (13)$$

where $e_{i,l}[n]$ is now obtained by substituting $g_{i,l}^{opt}[n]$ in Equation (9).

Now, for any given s and $\{G_i[n]\}$, we consider the optimization over $\{V_i[n]\}$. Here, with some abuse of notation, we also introduce N scaling factors $\beta[n], 1 \leq n \leq N$ where each $\beta[n] \geq \sqrt{\epsilon}$ for some fixed $\epsilon > 0$ such that the precoder used by the $i^{th}$ transmitter on slot n is $V_i[n]/\beta[n]$ while the receive filter used at the corresponding receiver is $\beta[n] G_i[n]$. Also, for notational convenience and without loss of generality, unless otherwise mentioned, we will assume $d_j[n] = M_j \forall n, j$. Let $\gamma[n] = \beta^2[n], \forall n, \alpha_{i,l}[n] = w_i[n] s_{i,l}[n]$ and $A_i[n] = \text{diag}([\alpha_{i,1}[n], \ldots, \alpha_{i,d_i[n]}[n]])$. Then, the problem of interest can be expressed in matrix form as in Equation (14). Next, we consider the following different approaches to solve Equation (14) as follows:

$$\min_{\substack{\{\gamma[n]\},\{V_i[n]\}:\gamma[n]\geq\varepsilon\forall n \\ \sum_{n=1}^{N}\text{diag}(V_i[n]V_i^\dagger[n]/\gamma[n])\leq P_i\forall i}} \sum_{i=1}^{K}\sum_{n=1}^{N}\left(\left\|A_i^{\frac{1}{2}}[n]G_i^\dagger[n]H_{i,i}[n]V_i[n] - A_i^{\frac{1}{2}}[n]\right\|^2 + \sum_{j\neq i}\left\|A_i^{\frac{1}{2}}[n]G_i^\dagger[n]H_{i,j}[n]V_j[n]\right\|^2 + \gamma[n]\underbrace{\left\|A_i^{\frac{1}{2}}[n]G_i^\dagger[n]\right\|^2}_{\delta_i[n]}\right) \quad (14)$$

$$\sum_{j=1}^{K}\left(\sum_{n=1}^{N}\left(\left\|R_j^{\frac{1}{2}}[n]V_j[n] - R_j^{-\frac{1}{2}}[n]H_{j,j}^\dagger[n]G_j[n]A_j[n]\right\|^2 - \left\|R_j^{-\frac{1}{2}}[n]H_{j,j}^\dagger[n]G_j[n]A_j[n]\right\|^2 + \gamma[n]\delta_j[n]\right) - Tr(\Lambda_j P_j)\right) \quad (16)$$

A description will now be given regarding transmit precoder optimization, in accordance with an embodiment of the present principles.

Approach I:

We first show that the per-antenna power constraints in Equation (14) can be posed as linear matrix inequalities. To do so, we define $\nabla_i=[V_i[1], \ldots, V_i[N]]^\dagger$, $\forall i$ along with a diagonal matrix $\Gamma_i=\text{diag}([\gamma[1], \ldots, \gamma[N]])\otimes I$ Then, expanding $\nabla_i$ as $\nabla_i=[\overline{v}_{i,1}, \ldots, \overline{v}_{i,M_i}]$, the per-antenna power constraints in Equation (14) can also be expressed as follows:

$$\begin{bmatrix} P_{i,m} & \overline{v}_{i,m}^\dagger \\ \overline{v}_{i,m} & \Gamma_i \end{bmatrix} \succeq 0, \forall i, m.$$

This observation along with the fact that the objective function in Equation (14) can be written as the sum of two terms, where the first one is a quadratic form in $\{V_i[n]\}$ and independent of $\{\gamma[n]\}$ and the second one is linear in $\{\gamma[n]\}$ and independent of $\{V_i[n]\}$, yields the following result.

Proposition 5:

The optimization problem in Equation (14) can be formulated as an SDP.

Proposition 5 implies that Equation (14) can be solved optimally via interior-point methods. However, practical implementation can often demand further complexity reduction.

Approach II:

For a given set of non-negative scalars $\{\lambda_{j,m}\in\mathbb{R}_+\}$ we define $\lambda_j=[\lambda_{j,1}, \ldots, \lambda_{j,M_j}]^T$ with $\Lambda_j=\text{diag}(\lambda_j)$, $\forall j$ and the following:

$$R_j[n] = \underbrace{\sum_{i=1}^{K}H_{i,j}^\dagger[n]G_i[n]A_i[n]G_i^\dagger[n]H_{i,j}[n] + \Lambda_j/\gamma[n]}_{Q_j[n]} \quad (15)$$

Henceforth, for convenience we will assume that $Q_j[n]$ is invertible for all $j$, $n$ Then, we can express the Lagrangian corresponding to Equation (14), denoted by $L(\{V_j[n]\}, \{\lambda_j\}, \{\gamma[n]\})$, as in Equation (16). This assumption causes no loss of generality since the techniques readily extend to the general case.

Let $$g(\{\lambda_j\}) = \min_{\{V_j[n]\},\{\gamma[n]\geq\varepsilon\}} \mathcal{L}(\{V_j[n]\}, \{\lambda_j\}, \{\gamma[n]\}) \quad (17)$$

denote the dual function and from Equation (16) notice that the optimizing $V_j[n]$ in Equation (17) must be the following:

$$\hat{V}_j[n] = R_j^{-1}[n]\underbrace{H_{j,j}^\dagger[n]G_j[n]A_j[n]}_{T_j[n]}, \quad (18)$$

$$g(\{\lambda_j\}) = -\sum_{j=1}^{K}Tr(\Lambda_j P_j) - \quad (19)$$

$$\sum_{n=1}^{N}\max_{\{\gamma[n]\geq\varepsilon\}}\left\{\sum_{j=1}^{K}\underbrace{\left\|R_j^{-\frac{1}{2}}[n]H_{j,j}^\dagger[n]G_j[n]A_j[n]\right\|^2 - \gamma[n]\delta_j[n]}_{h(\lambda_j,\gamma[n])}\right\}$$

using which the dual function simplifies to Equation (19). Then, we offer the following result.

Proposition 6:

For any given $\{\lambda_j\succeq 0\}$ and $n\in\{1, \ldots, N\}$ the function $h(\lambda_j, \gamma[n])$ is concave in $\gamma[n]$ for $\gamma[n]>0$.

Thus the optimal $\{\gamma[n]\}$ in Equation (17), denoted by $\{\hat{\gamma}[n]\}$, can be found via bi-section search. Finally the dual problem, $\max_{\{\lambda_j\succeq 0,\forall j\}}g(\{\lambda_j\})$, which is equivalent to the following:

$$\min_{\{\lambda_j\geq 0\}}\max_{\{\gamma[n]\geq\varepsilon\}}\left\{\sum_{j=1}^{K}Tr(\Lambda_j P_j) + \sum_{n=1}^{N}\sum_{j=1}^{K}h(\lambda_j, \gamma[n])\right\} = \quad (20)$$

$$\min_{\{\lambda_j\geq 0\}}\left\{\sum_{j=1}^{K}Tr(\Lambda_j P_j) + \sum_{n=1}^{N}\sum_{j=1}^{K}h(\lambda_j, \hat{\gamma}[n])\right\}$$

can be solved via the sub-gradient method after invoking the following result.

Proposition 7:

At any given $\{\lambda_j\succeq 0\}$, a sub-gradient for the minimization problem in (20) is given by $r=\{r_j\}$, where the following applies:

$$r_j = P_j - \sum_{n=1}^{N}\text{diag}(\hat{V}_j[n]\hat{V}_j^\dagger[n]/\hat{\gamma}[n]) \quad (21)$$

Approach 3:

We first offer the following result.

Proposition 8:

For any given $\gamma[n]>0$ and $j\in\{1, \ldots, K\}$, the function $h(\lambda_j, \gamma[n])$ is convex in $\lambda_j\succeq 0$.

Invoking Propositions 6 and 8 along with the generalized minimax theorem we obtain that the dual problem in Equation (20) is also equivalent to the following:

$$\max_{\{\gamma[n]\geq\varepsilon\}} \min_{\{\lambda_j\geq 0\}} \left\{ \sum_{j=1}^{K} Tr(\Lambda_j P_j) + \sum_{n=1}^{N}\sum_{j=1}^{K} h(\lambda_j, \gamma[n]) \right\} \quad (22)$$

Then, expand $T_j[n]$ defined in Equation (18) as $T_j[n]=[t_{j,1}[n],\ldots,t_{j,M_j}[n]]\forall j, n$ and define the $NM_j(M_j+1)\times NM_j(M_j+1)$ matrix $F_{j,0}=\text{Blkdiag}(F_{j,m}[n])_{m=1,n=1}^{M_j,N}$ where the following applies:

$$F_{j,m}[n] = \begin{bmatrix} 0 & \sqrt{\gamma[n]}\, t_{j,m}^{\dagger}[n] \\ \sqrt{\gamma[n]}\, t_{j,m}[n] & \gamma[n]Q_j[n] \end{bmatrix},$$

along with $L_{j,m}=I\otimes \text{diag}\{0_{1\times m},1,0_{1\times M_j-m}\}, 1\leq m\leq M_j$. Further, let $E_{j,m}[n]$, $\forall j, m, n$ be an $NM_j(M_j+1)\times NM_j(M+1)$ matrix with all its entries being zero except its $((n-1)M_j(M_j+1)+(M_j+1)(m-1)+1)^{th}$ diagonal element which is one. Then, the inner minimization in Equation (22) is equivalent to an SDP given by the following:

$$\sum_{j=1}^{K} \min_{\{w_{j,m}[n]\in\mathbb{R}_+, \lambda_{j,m}\in\mathbb{R}_+\}} \left\{ \sum_{m=1}^{M_j}\sum_{n=1}^{N} w_{j,m}[n] + \sum_{m=1}^{M_j} P_{j,m}\lambda_{j,m} \right\} F_{j,0} + \sum_{n=1}^{N}\sum_{m=1}^{M_j} E_{j,m}[n]w_{j,m}[n] + \sum_{m=1}^{M_j} L_{j,m}\lambda_{j,m} \succeq 0, \quad (23)$$

for all $j$

Next, invoking Lemma 2, each minimization in Equation (23) can in turn be expressed as the maximization of its dual given by the following:

$$\max_{\theta_j\in\mathbb{R}_+, Z_j\succeq 0} \theta_j \quad (24)$$

$$Tr(F_{j,0}Z_j) \leq -\theta_j, \forall\, j;\ Tr(E_{j,m}[n]Z_j) \leq 1, \forall\, m, n, j$$

$$Tr(L_{j,m}Z_j) \leq P_{j,m}, \forall\, m, j.$$

Notice that without loss of optimality we can assume $Z_j$ in Equation (24) to be block diagonal. Thus the dual problem in Equation (22) is equivalent to the following:

$$\max_{\{\gamma[n]\geq\varepsilon\},\{\theta_j\in\mathbb{R}_+, Z_j\succeq 0\}} -\sum_{n=1}^{N}\sum_{j=1}^{K}\delta_j[n]\gamma[n] + \sum_{j=1}^{K}\theta_j \quad (25)$$

$$Tr(F_{j,0}Z_j) \leq -\theta_j, \forall\, j;\ Tr(E_{j,m}[n]Z_j) \leq 1, \forall\, m, n, j$$

$$Tr(L_{j,m}Z_j) \leq P_{j,m}, \forall\, m, j.$$

Equation (25) can now be sub-optimally solved via alternating optimization. In particular, for a gien set of $Z_j \succeq 0$, expand each $Z_j$ as $Z_j=\text{Blkdiag}\{Z_{j,m}[n]\}_{m=1,n=1}^{M_j,N}$ with the following:

$$Z_{j,m}[n] = \begin{bmatrix} z_{j,m}[n] & \check{z}_{j,m}^{\dagger}[n] \\ \check{z}_{j,m}[n] & \check{Z}_{j,m}[n] \end{bmatrix}.$$

Then, for each n the optimal $\gamma[n]$ can be obtained in closed form as the square of the following:

$$\max\left\{\varepsilon, -\frac{\sum_{j=1}^{K}\sum_{m=1}^{M_j} \text{Real}(\check{z}_{j,m}^{\dagger}[n]t_{j,m}[n])}{\sum_{j=1}^{K}\delta_j[n] + \sum_{j=1}^{K}\sum_{m=1}^{M_j} Tr(Q_j[n]\check{Z}_{j,m}[n])}\right\}$$

On the other hand, for a given set of $\{\gamma[n]\}$, the SDP in Equation (25) can be efficiently solved. Specifically, since Equation (25) decouples over $j\in\{1,\ldots,K\}$, for each j we can employ bisection search. In each iteration for a candidate $\theta_j$, we have to solve a feasibility problem in which we have to determine if $\exists Z_j\succeq 0$ such that the following applies:

$$Tr(F_{j,0}Z_j)+\theta_j\leq 0; Tr(E_{j,m}[n]Z_j)-1\leq 0, \forall m,n;$$

$$Tr(L_{j,m}Z_j)-P_{j,m}\leq 0, \forall m \quad (26)$$

Such feasibility problems can indeed be efficiently solved via online convex optimization methods.

Approach 4:

We first invoke the equivalent form of the dual problem obtained in Equation (22). Next, for a fixed $\{\gamma[n]\}$, we can solve the inner minimization by leveraging a known iterative method. Starting from any $\{\lambda_{j,m}\in\mathbb{R}_+\}$ we first compute $R_j[n]$ in Equation (15) followed by $S_j[n]=R_j^{-1}[n]$ and expand it as $S_j[n]=[s_{j,1}[n],\ldots,s_{j,M_j}[n]]$. Then, we compute the following:

$$\check{q}_{j,m}[n]=\lambda_{j,m}s_{j,m}^{\dagger}[n]T_j[n]/(\gamma[n]) \quad (27)$$

followed by the following:

$$\lambda_{j,m} = \sqrt{\frac{\sum_{n=1}^{N}\gamma[n]\|\check{q}_{j,m}[n]\|^2}{P_{j,m}}} \quad (28)$$

Equations (27) and (28) are iterated until convergence. Upon convergence, we update $\{\gamma[n]\}$ via bi-section search after invoking Proposition 6. The whole process is then repeated until convergence. Unfortunately, no convergence guarantees can be claimed for this method.

Approach 5:

Here, we first optimize the transmit precoders with respect to total power constraints. In particular, considering Equation (14) we first set the variables $\{\gamma[n]\}$ to be unity and define $P_i=\sum_{m=1}^{M_i} P_{i,m}$ to be the sum power budget at the $i^{th}$ transmitter. Then, we can deduce that the optimal precoder at the $i^{th}$ transmitter albeit under a sum power constraint must be $\hat{V}_j[n]=(Q_j[n]+v_jI)^{-1}T_j[n]$, where the scalar $v_j\in\mathbb{R}_+$ can be determined via bisection search to satisfy $\sum_{n=1}^{N}\|\hat{V}_j[n]\|^2\leq P_i$. Once $\{\hat{V}_j[n]\}$ are determined for all j, n then we optimize $\{\gamma[n]\}$ in Equation (14) after fixing $\{V_j[n]=\hat{V}_j[n]\}$. This latter problem is readily seen to be a geometric program in $\{\gamma[n]\}$ and hence can be efficiently solved.

Approach 6:

Here, we optimize the transmit precoders after fixing the variables $\{\gamma[n]\}$ to be unity. Then, the dual problem reduces to just the inner minimization over $\{\lambda_j\}$ in (22), i.e., $$\min_{\{\lambda_j \geq 0\}} \left\{ \sum_{j=1}^{K} Tr(\Lambda_j P_j) + \sum_{n=1}^{N} \sum_{j=1}^{K} h(\lambda_j, \gamma[n]) \right\} \quad (29)$$

which we have shown to be equivalent to an SDP given by (23). Note here that now in defining $h(\lambda_j, \gamma[n])$, $\forall j$, n and $F_{j,0}$, $\forall j$ we set $\{\gamma_j[n]=1, \forall n\}$. The transmit precoders are obtained by solving the latter SDP. Note that in this case we do not optimize over $\{\gamma[n]\}$ which remain fixed at unity.

A description will now be given regarding alternating optimization, in accordance with an embodiment of the present principles.

The results described above with respect to transceiver optimization suggest a natural (iterative) algorithm for weighted-sum rate maximization as follows:

1. Initialize $\{V_j[n]\}$;
2. Update $\{G_i[n]\}$,s;
3. Update $\{V_j[n]\}$;
4. Iterate above two steps until convergence or a maximum number of iterations is reached.

Note that any one of the six approaches for transmit precoder optimization described above with respect to transmit precoder optimization can be used in Step 3. However, when a sub-optimal precoder optimization method is used, its output should be accepted for update only if it improves the objective function in Equation (11).

Theorem 9

The above algorithm is guaranteed to converge.

The updates in the algorithm result in monotone increase of objective function in Equation (11). Since the objective function is bounded above, this monotonicity guarantees convergence. Note that in all the aforementioned approaches for transmit precoder optimization wherein the corresponding dual problem problem is solved, we can readily obtain the updated transmit precoder from the optimized Lagrange variables, for instance by using Equation (18) along with simple scaling to enforce the per-antenna power constraints if needed.

Thus, the present principles advantageously solve the "weighted sum rate" problem by proposing design algorithms using a systematic approach. Towards this end, we have developed new iterative algorithms for precoder design through ingenious sub-problem formulations such that each of these can be solved optimally. The sub-problems pertaining to the receiver filter update and the slack variable update are solved in closed-form, whereas those pertaining to the transmit precoder update are formulated as various convex problems. Together these different formulations allow efficient computation over a wide range of scenarios.

A description will now be given regarding some of the many attendant advantages of the present principles. One advantage is that the present principles significantly improve the performance of the precoders over prior art by allowing multiple stream transmission on each slot while enforcing per-antenna power constraints. Another advantage is that by breaking the precoder design procedure into the convex optimization sub-problems, our presented procedure has guaranteed convergence and provides a relatively fast computing design of the precoders. Yet another advantage is that several transmit precoder update methods are suggested which enable efficient operation over a wide range of scenarios.

Hence, as noted above, the present principles are directed to the problem of maximizing the weighted sum rate. To that end, the present principles advantagesouly propose six design procedures.

A significant contribution of the present principles is in designing transmit precoders that allow multiple stream data transmission for each transmitter-receiver pair on each slot, such that the weighted sum rate metric is maximized (per Equation (8)). The transmit precoders satisfy per-antenna power constraints (as per Equation (2)), i.e., for each transmit antenna a sum power constraint (across all slots) is satisfied.

We discuss six of the proposed algorithms that all have a common structure. All of these six algorithms include an iteration of two steps. In the first step, each algorithm updates receiver filters and a set of slack variables. In the next step, each algorithm updates the transmit precoders. The difference between the proposed six algorithms is in their respective steps for updating the transmit precoders. Even though each algorithm is sub-optimal with respect to the problem in Equation (8), each algorithm is guaranteed to converge and yield a good solution. All these six algorithms use identical closed-form expressions for updating receiver filters and slack variables. For updating transmit precoders (the problem in Equation (14)), a different approach is used in each algorithm.

In an embodiment, the input to the algorithms can include, but is not limited to, for example: Channel matrices $H_{ij}[n]$ for receivers $1 \leq i \leq K$ and transmitters $1 \leq j \leq K$; slots $1 \leq n \leq N$; number of streams for all transmitter-receiver pairs on each slot $d_i[n] 1 \leq i \leq K$, $1 \leq n \leq N$; per-antenna power bounds $P_{jm}$, $1 \leq j \leq K$, $1 \leq m \leq M_j$.

In an embodiment, the output of the algorithms can include, for example, transmit precoders for each transmitter $V_j[n] 1 \leq j \leq K$ on each slot $1 \leq n \leq N$.

We now summary the key steps of the algorithms as follows:

1. Initialize the transmit precoders $V_j[n]$ for transmitters $1 \leq j \leq K$ to a set of non-zero values satisfying the power constraints in Equation (2).
2. Update receiver filters $G_i[n]$ for receivers $1 \leq i \leq K$ using Equation (12), and slack variables s using Equation (13).
3. Update transmit precoders $V_j[n]$ for transmitters $1 \leq j \leq K$ using the transmit precoder update step.
4. Iterate above two steps until convergence.

We note that a firm upper bound on the run-time can be incorporated by including an additional condition in step 4 above, which says that the procedure should terminate if a given maximum number of iterations have been done.

Some of the key innovations of the present principles include, but are not limited to, the following:

1. The introduction of slack variables s such that the problem formulation in Equation (8) can be expanded as Equation (11) which comprises of two tractable sub-problems.
2. The six different update steps for updating the transmit precoders. Each update method can be advantageous in terms of lower complexity and faster convergence in a certain regime. For example, in the scenario where the number of transmit antennas at a transmitter is much larger than the total number of streams (across all slots) sent from that transmitter, one approach is more beneficial than the others.

Figure 9:
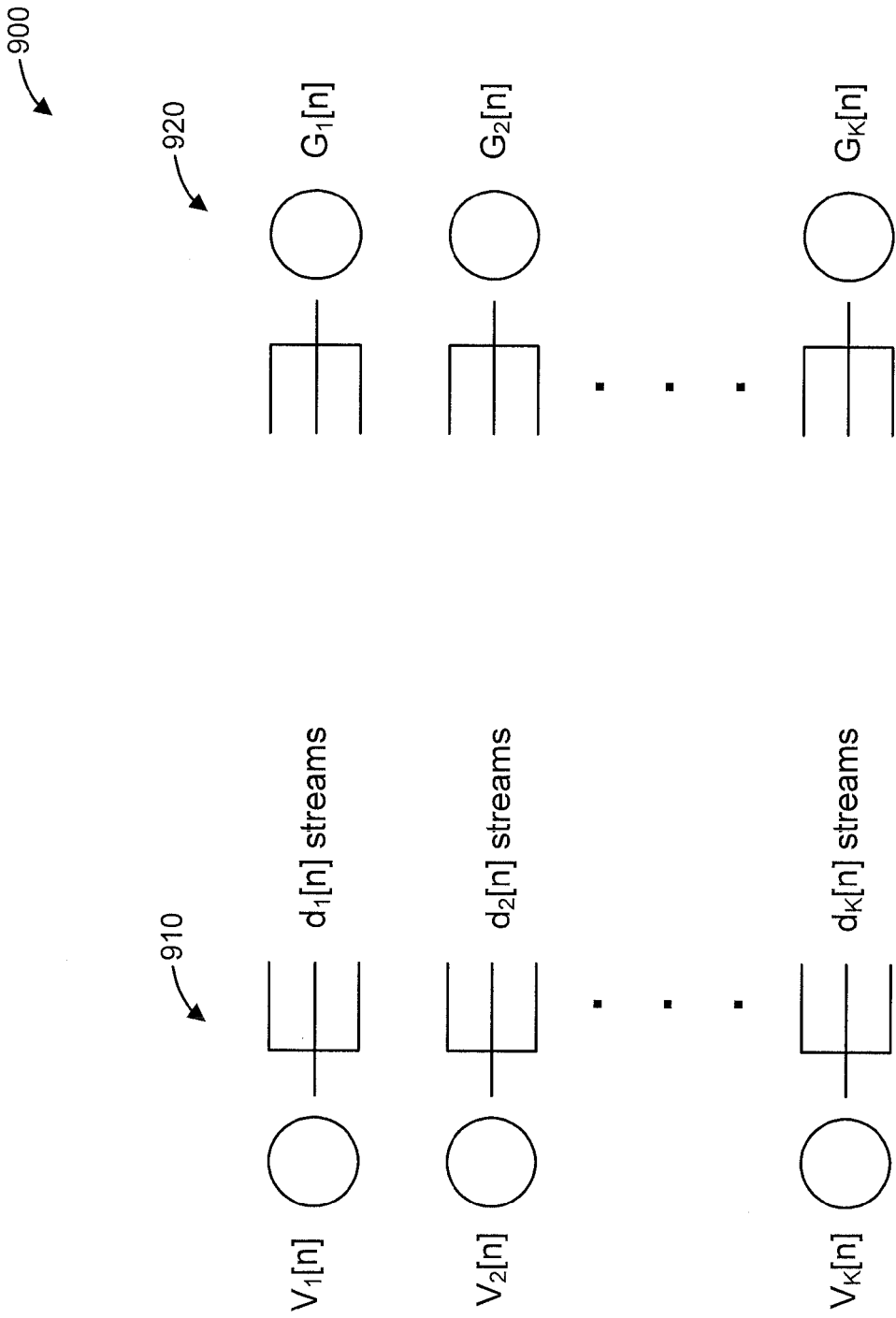
FIG. 9 shows an exemplary operating environment 900 to which the present principles can be applied, in accordance with an embodiment of the present principles.

The proposed schemes are applicable to wideband MIMO Gaussian interference channels including K transmitters and N slots. Each transmitter communicates with its pre-determined receiver on each slot. The j-th transmitter has $M_j$ antennas and transmits $d_j[n]$ streams on slot n. This system model is shown in FIG. 9 for a slot n. In particular, FIG. 9 shows an exemplary operating environment 900 to which the present principles can be applied, in accordance with an embodiment of the present principles. The operating environment 900 includes $V_1[n]$ through $V_K[n]$ precoders 910 for transmitters $1 \leq j \leq K$, and $G_1[n]$ through $G_K[n]$ receiver filters 920.

We consider the most important objective that is widely used in existing system designs, i.e., weighted-sum rate. The weighted-sum rate problem can be expressed as follows:

$$\max_{\{V_j[n]\}} \sum_j w_j[n] R_j[n]$$

Note that this problem does not have direct solutions i.e., there are no existing methods that solve it optimally. Thus, we solve this problem sub-optimally. Even though sub-optimal, in this approach, the sub-problems obtained from the main problem are solvable. Furthermore, the iterative algorithms that result from these sub-problems to solve the original problem are guaranteed (theoretically) to converge.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for generating transmit precoders for a communication system having a plurality of transmitters and a plurality of receivers forming a plurality of transmitter-receiver pairs, each of the plurality of transmitters and the plurality of receivers having a respective plurality of antennas, the method comprising:
   initializing the transmit precoders;
   updating a plurality of receiver filters and a plurality of slack variables using closed form expressions and updating the transmit precoders responsive to said updated receiver filters and slack variables; and
   iteratively repeating the updating steps until convergence is reached to obtain a final set of transmit precoders,
   wherein the transmit precoders are updated to perform precoding for multiple stream data transmission for each of the plurality of transmitter-receiver pairs on each of a plurality of slots under a per-antenna power constraint imposed on each of the plurality of antennas;
   wherein said step of updating the transmit precoders comprises:
   computing, using a bi-section search method, a dual function for a set of Lagrange variables corresponding to the per-antenna power constraint imposed on each of the plurality of transmitters; and
   optimizing the dual function using a sub-gradient method.

2. The method of claim 1, wherein said initializing step initializes the transmit precoders to a set of non-zero values satisfying the per-antenna power constraint imposed on each of the plurality of transmitters.

3. The method of claim 1, wherein said step of updating the transmit precoders comprises reformulating a weighted sum rate objective maximization problem as a semi-definite programming problem that considers all of the plurality of transmitters.

4. The method of claim 3, wherein the semi-definite programming problem is a convex problem solvable using interior-point methods.

5. The method of claim 1, wherein said step of updating the transmit precoders comprises:
   computing a dual function for a set of Lagrange variables corresponding to the per-antenna power constraint imposed on each of the plurality of transmitters and setting up an optimization problem based on the dual function;
   reformulating the optimization problem in an alternate and equivalent form that comprises an outer maximization over a set of scaling factors and an inner minimization over the set of Lagrange variables; and
   solving the optimization problem in the alternate and equivalent form using an iterative method.

6. The method of claim 1, wherein said step of updating the transmit precoders comprises:
   computing a dual function for a set of Lagrange variables corresponding to the per-antenna power constraint imposed on each of the plurality of transmitters and setting up an optimization problem based on the dual function;
   reformulating the optimization problem in an alternate and equivalent form that comprises a joint maximization over two sets of variables; and
   solving the optimization problem in the alternate and equivalent form using an alternating maximization approach that maximizes the two sets of variables in an alternating manner.

7. The method of claim 1, wherein said step of updating the transmit precoders comprises:
   computing a dual function for a set of Lagrange variables corresponding to a per-antenna power constraint imposed on each of the plurality of transmitters and setting up an optimization problem based on the dual function; and reformulating the optimization problem as a semi-definite programming problem; and solving the semi-definite programming problem.

8. A method for generating transmit precoders for a communication system having a plurality of transmitters and a plurality of receivers forming a plurality of transmitter-receiver pairs, each of the plurality of transmitters and the plurality of receivers having a respective plurality of antennas, the method comprising:

initializing the transmit precoders;

updating a plurality of receiver filters and a plurality of slack variables using closed form expressions and updating the transmit precoders responsive to said updated receiver filters and slack variables; and iteratively repeating the updating steps until convergence is reached to obtain a final set of transmit precoders, wherein the transmit precoders are updated to perform precoding for multiple stream data transmission for each of the plurality of transmitter-receiver pairs on each of a plurality of slots under a per-antenna power constraint imposed on each of the plurality of antennas wherein said step of updating the transmit precoders comprises:

optimizing the transmit precoders under a total power constraint imposed on each of the plurality of transmitters; and scaling the optimized transmit precoders to enforce the per-antenna power constraint imposed on each of the plurality of transmitters, wherein scaling factors used to scale the optimized transmit precoders are determined using a geometric program.

9. An apparatus for generating transmit precoders for a communication system having a plurality of transmitters and a plurality of receivers forming a plurality of transistor-receiver pairs, each of the plurality of transmitters and the plurality of receivers having a respective plurality of antennas, the apparatus comprising:

a transmit precoder initializer for initializing the transmit precoders;

an updater for updating a plurality of receiver filters and a plurality of slack variables, as a first part of an iteration;

a transmit precoder updater for updating the transmit precoders responsive to updated receiver filters and slack variables, as a second part of the iteration; and an iteration controller for iteratively repeating the first part of the iteration that updates of the receiver filters and the slack variables and the second part of the iteration that updates the transmit precoders until convergence is reached to obtain a final set of transmit precoders, wherein the transmit precoders are updated to perform precoding for multiple stream data transmission for each of a plurality of transmitter-receiver pairs on each of a plurality of slots under a per-antenna power constraint imposed on each of the plurality of transmitters, the receiver filters and the slack variables being updated using closed form expressions;

wherein said transmit precoder updater updates the transmit precoders by computing a dual function for a set of Lagrange variables corresponding to the per-antenna power constraint imposed on each of the plurality of transmitters and setting up an optimization problem based on the dual function, reformulating the optimization problem as a semi-definite programming problem and solving the semi-definite programming problem.

10. The apparatus of claim 9, wherein said transmit precoder initializer initializes the transmit precoders to a set of non-zero values satisfying the per-antenna power constraint imposed on each of the plurality of transmitters.

11. The apparatus of claim 9, wherein said transmit precoder updater updates the transmit precoders by reformulating a weighted sum rate objective maximization problem as a semi-definite programming problem that considers all of the plurality of transmitters.

12. The apparatus of claim 11, wherein the semi-definite programming problem is a convex problem solvable using interior-point methods.

13. The apparatus of claim 9, wherein said transmit precoder updater updates the transmit precoders by computing, using a bi-section search method, a dual function for a set of Lagrange variables corresponding to the per-antenna power constraint imposed on each of the plurality of transmitters, and optimizing the dual function using a sub-gradient method.

14. The apparatus of claim 9, wherein said transmit precoder updater updates the transmit precoders by computing a dual function for a set of Lagrange variables corresponding to the per-antenna power constraint imposed on each of the plurality of transmitters and setting up an optimization problem based on the dual function, reformulating the optimization problem in an alternate and equivalent form that comprises an outer maximization over a set of scaling factors and an inner minimization over the set of Lagrange variables, and solving the optimization problem in the alternate and equivalent form using an iterative method.

15. The apparatus of claim 9, wherein said transmit precoder updater updates the transmit precoders by computing a dual function for a set of Lagrange variables corresponding to the per-antenna power constraint imposed on each of the plurality of transmitters and setting up an optimization problem based on the dual function, reformulating the optimization problem in an alternate and equivalent form that comprises a joint maximization over two sets of variables, solving the optimization problem in the alternate and equivalent form using an alternating maximization approach that maximizes the two sets of variables in an alternating manner.

16. The apparatus of claim 9, wherein said transmit precoder updater updates the transmit precoders by optimizing the transmit precoders under a total power constraint imposed on each of the plurality of transmitters, and scaling the optimized transmit precoders to enforce the per-antenna power constraint imposed on each of the plurality of transmitters, wherein scaling factors used to scale the optimized transmit precoders are determined using a geometric program.

* * * * *